United States Patent [19]

Singletary

[11] 4,416,492
[45] Nov. 22, 1983

[54] SYSTEM FOR AUTOMATICALLY ALIGNING A SUPPORT ROLLER SYSTEM UNDER A ROTATING BODY

[75] Inventor: B. Huston Singletary, Oak Ridge, Tenn.

[73] Assignee: The United States of America as represented by the U.S. Department of Energy, Washington, D.C.

[21] Appl. No.: 400,544

[22] Filed: Jul. 21, 1982

[51] Int. Cl.³ .................. F16C 13/06; F16C 23/04
[52] U.S. Cl. .................................. 308/203; 308/204; 384/192; 384/206
[58] Field of Search ............... 308/204, 203, 202, 2 R, 308/4 R; 384/192, 205, 206, 208, 256, 440, 425; 29/110, 115, 116 R; 193/37, 42; 34/108, 121, 126; 248/55, 130; 211/164; 432/103

[56] References Cited

U.S. PATENT DOCUMENTS

| 532,629 | 1/1895 | Bacon | 308/204 |
|---|---|---|---|
| 2,521,731 | 9/1950 | Kennedy | 308/203 X |
| 2,551,774 | 5/1951 | Traylor, Jr. | 308/203 |
| 2,570,082 | 10/1951 | Traylor, Jr. | 308/203 X |
| 3,561,132 | 2/1971 | La Grone | 308/203 X |
| 3,836,103 | 9/1974 | Retali et al. | 308/203 X |

Primary Examiner—Stuart S. Levy
Assistant Examiner—Thomas R. Hannon
Attorney, Agent, or Firm—Edwin D. Grant; Stephen D. Hamel; Richard G. Besha

[57] ABSTRACT

Two support rings on a rotatable drum respectively engage conically tapered end surfaces of support rollers mounted on pivot universally relative to its axis of rotation and translate therealong. Rotation of the drum on differential conical support roller diameters causes pivotal steering and axial translation of support roller until roller is centered on support rings.

4 Claims, 1 Drawing Figure

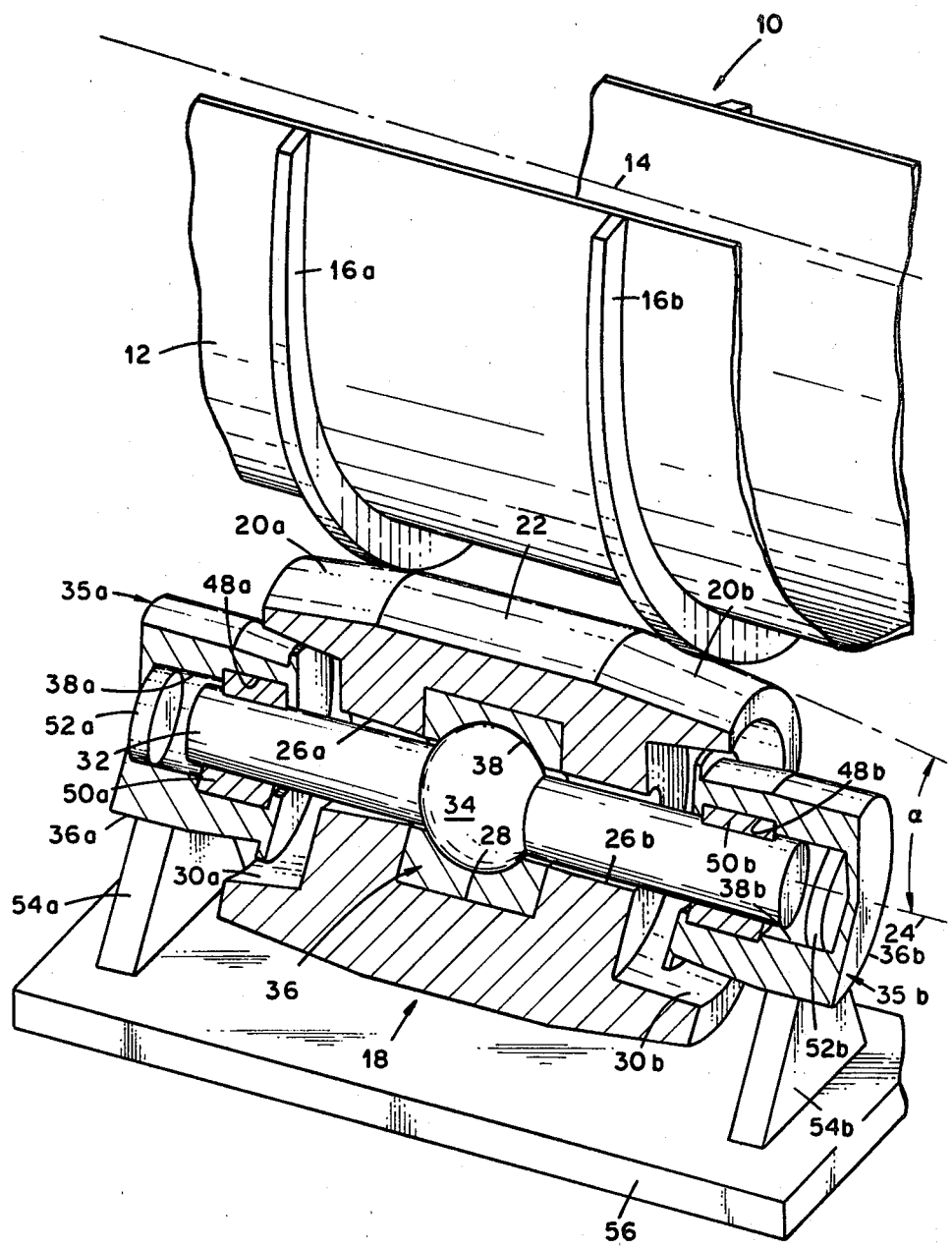

SYSTEM FOR AUTOMATICALLY ALIGNING A SUPPORT ROLLER SYSTEM UNDER A ROTATING BODY

BACKGROUND OF THE INVENTION

The invention disclosed herein resulted from a contract with the United States Department of Energy and relates to a system which automatically aligns support rollers under a rotating body when the latter is separately restrained from longitudinal axis translation via thrust rollers or other conventional means.

Rotary processing drums or tubes such as cement kilns are conventionally provided with two or more cylindrical section rolling rings which extend around their outer surfaces and rest on four or more underlying cylindrical support rollers. Translation of these rotating drums along their longitudinal axes of rotation is conventionally restrained by thrust rollers. Misalignments between the drum and support roller axes of rotation cause large forces to develop at the contacting surfaces of the support rollers and the drum support rings. Continued rotation results in sliding movement between the support rings and support rollers which galls the contacting surfaces and causes premature bearing failure.

SUMMARY OF THE INVENTION

It is the object of this invention to provide a support system for a rotating body such as a cement kiln that automatically keeps the rotation axes of the rotating body and its support rollers properly aligned.

Another object of this invention is to provide a mounting for a rotating drum support roller that automatically reduces galling wear on both the drum rolling rings and the support rollers.

A third object of this invention is to reduce thrust loads between rotating drum-like objects and their support rollers, thereby reducing bearing loads and prolonging both thrust roller and support roller bearing life.

These objects and other advantages are achieved by a preferred embodiment of the invention comprising: a rotatable body having mounted thereon associated pairs of crowned support rings which project outwardly from and extend around the periphery of the body in spaced apart relation axially of its axis of rotation; rollers each having at opposite ends thereof tapered peripheral surfaces which respectively engage a pair of said support rings; and means for supporting each of said rollers for (1) rotation about a second axis generally parallel to the axis of rotation of said body, (2) universal pivotal movement relative to said second axis, and (3) reciprocation along said second axis.

DESCRIPTION OF THE DRAWING

The drawing is a pictorial representation of the preferred embodiment of the invention, with certain components thereof being cut away so that other components can be seen.

DETAILED DESCRIPTION OF THE PREFERRED EMBODIMENT

In the drawing, reference number 10 generally designates a body which has a cylindrical wall 12 and which rotates about its longitudinal axis 14, translation of said body along longitudinal axis 14 being restrained by conventional thrust rollers or other means. This body may be, for example, a parts tumbling drum or a large tubular cement kiln. A pair of identical crown radiused support rings 16a, 16b are attached to body 10 in at least two locations along longitudinal axis 14 by suitable means and project outwardly from and extend around its periphery in spaced apart relation axially of axis 14.

Reference number 18 generally designates one of two support rollers associated with each pair of support rings. Each roller has at opposite ends thereof peripheral surfaces 20a, 20b which respectively contact the outer crown radiused surfaces of support rings 16a, 16b. The portion 22 of the roller disposed between these tapered end surfaces may be cylindrical. Surfaces 20a, 20b are identically shaped conical sections which decrease in diameter toward the ends of the roller, and their angle of inclination relative to the longitudinal axis 24 of the roller may vary in different applications of the invention (this angle being exaggerated in the drawing for clarity). The longitudinal axis 24 of roller 18 is generally, but is not required to be, precisely parallel to the longitudinal axis 14 of body 10.

Extending between the end surfaces of roller 18 is an aperture centered on the longitudinal axis 24 of the roller and formed with two bores 26a, 26b that taper in opposite directions axially of said axis (both bores decreasing in diameter toward the center of the roller), a middle bore 28 lying between bores 26a, 26b and having a larger diameter than the latter, and oppositely tapered counterbores 30a, 30b at opposite ends of the roller.

A cylindrical shaft 32 is disposed within the aperture in roller 18 with its ends respectively projecting beyond the end surfaces of the roller. Integrally formed on shaft 32 is a ball-type swivel surface 34 which projects radially outwardly from the middle portion thereof. Reference number 36 generally designates an annular bearing which conformably fits within bore 28 and includes a spherical inner surface 38 pivotally engaged with swivel surface 34 on shaft 32. The ends of shaft 32 are respectively mounted in support elements generally designated by reference numbers 35a, 35b, each of these support elements comprising (1) a cup-shaped housing 36a, 36b having therein a cavity 38a, 38b with an enlarged bore 48a, 48b adjacent its open end, (2) a first annular bearing 50a, 50b fitted in said bore and having an aperture of such diameter that shaft 32 can slide therein and thus reciprocate along and rotate about axis 24, and (3) a second disk-shaped thrust bearing 52a, 52b disposed in cavity 38a, 38b between the adjacent end of shaft 32 and the end wall of housing 36a, 36b. Suitable means such as support lugs 54a, 54b are respectively attached to housing 36a, 36b and to a fixed base 56 to hold the housing stationary.

OPERATION OF THE PREFERRED EMBODIMENT OF THE INVENTION

If, for any reason, support rings 16a and 16b of body 10 unsymmetrically contact conical surfaces 20a and 20b of body 18 at different diameters along the roller conical surfaces, any rotation of body 10 about axis 14 results in differential rolling path lengths attempting to be developed on surfaces 20a and 20b. Since both surfaces 20a and 20b rotate through the same angle about axis 24, this attempted rolling path length difference causes a steering couple to be created on body 18 about spherical bearing 24. Continued rotation of body 10 causes this steering to effect a translation of body 18 along axis 24 until body 18 asymptotically approaches the location at which contacting conical roller diameters on surfaces 20a and 20b are equal. Body 18 then continued to roll in a straight path centered between support rings 16a and 16b. Translation of body 18 along axis 24 is limited by thrust bearings 52a, 52b.

These pivotal and translational movements of roller 18 reduce the wear which drum support rings, rollers, and thrust bearing and roller bearings of conventional design are subjected to in use. In manufacturing operations wherein rotating drums or the like are placed in an enclosure to protect personnel from toxicity, radioactivity or other dangers, the disclosed roller arrangement provides the advantages of reducing maintenance and adjustment that must be performed under hazardous conditions.

What is claimed is:

1. A system for supporting a body for rotation about a central axis extending therethrough, comprising:

a pair of support rings mounted on said body and projecting outward therefrom and extending around its periphery in spaced apart relation axially of said central axis;

a support roller having at opposite ends thereof tapered peripheral surfaces which respectively engage the outermost surfaces of said support rings and which decrease in diameter toward the ends of the roller, an aperture extending between the end surfaces of said roller and having a ball-type swivel surface formed at the middle portion thereof, a shaft disposed within the aperture in said roller with its ends projecting outward therefrom, the middle portion of said shaft being formed with a ball-type swivel surface conformably engaging the swivel surface on said roller to thereby permit universal pivotal movement of the roller relative to the shaft; and a pair of fixedly positioned support elements each comprising: (1) a housing (2) an annular bearing fixed in said housing and slidably fitted around a respective end of said shaft so that the shaft is reciprocatable along the central axis of the bearing, and (3) means for limiting movement of said shaft along the central axis of said bearing.

2. The system of claim 1 wherein the housing of each of said support elements is cup-shaped and said bearing associated therewith is fixedly positioned within the cavity therein.

3. The system of claim 2 including a disk-shaped thrust bearing disposed in the cavity of the housing of each of said support elements between the associated end of said shaft and an end wall of the housing.

4. The system of claim 3 wherein said body having said support rings mounted thereon is a tube or drum in which a material is processed.

* * * * *